United States Patent [19]
Preston

[11] Patent Number: 4,550,481
[45] Date of Patent: Nov. 5, 1985

[54] ELEMENT REMOVAL TOOL FOR SYSTEM CARRYING FLUID UNDER PRESSURE

[76] Inventor: Stephen W. Preston, 393 W. Marigold St., Altadena, Calif. 91001

[21] Appl. No.: 565,636

[22] Filed: Dec. 27, 1983

[51] Int. Cl.⁴ .............................................. B23P 19/04
[52] U.S. Cl. .................................................. 29/213 R
[58] Field of Search ................ 29/213 R, 213 E, 240; 137/317, 318, 319

[56] References Cited

U.S. PATENT DOCUMENTS

| | | | |
|---|---|---|---|
| Re. 27,895 | 1/1974 | Ray | 29/213 |
| 1,736,561 | 11/1929 | Wattel | 29/213 |
| 3,644,982 | 2/1972 | Anderson | 29/213 |
| 3,689,979 | 9/1972 | Palat | 29/213 |

*Primary Examiner*—James L. Jones, Jr.
*Attorney, Agent, or Firm*—Bruce L. Birchard

[57] ABSTRACT

A tool is provided which permits the removal and replacement of a defective axle box in a flow meter or volume-pressure corrector ("system member") without disturbing downstream consumers of the fluid (e.g., gas), under pressure, passing through the system, such tool having an orientable flange for connecting directly to the flat upper surface of the member, such flange being supported on a second end of a first pipe, the first end of which is threaded to receive a second pipe having therein gas impervious stuffing with a coaxial hole therethrough to receive, with a hermetic seal, the shaft of an element-removal portion of the tool, such shaft having a socket affixed to one end thereof and a handle removable attached to the other end, such second pipe having a threaded end for connecting to said first pipe and a selectively operable bleed-hole located in its wall between said threaded end and said stuffing to permit safe and controlled release of gas from said second pipe after the socket of said removal tool has been withdrawn to a point on the stuffing side of a gate valve in the first pipe, when the first and second pipes are connected, the removable handle on said shaft making it possible to engage an axle box with the socket on the shaft and then slide the shaft through the hole in the stuffing and assemble the overall tool in position with the flange bolted to the flat surface of the member, to provide a tool with maximum safety and efficiency but with minimum complexity.

5 Claims, 2 Drawing Figures

ELEMENT REMOVAL TOOL FOR SYSTEM CARRYING FLUID UNDER PRESSURE

BACKGROUND OF THE INVENTION

1. Field of the Invention

This invention relates to the field of tools and more particularly to the field of specialized tools for maintaining transmission lines carrying volatile fluids under pressure.

2. Prior Art

In the transmission of highly volatile liquids, such as gasoline, or in the transmission of natural gas, it is necessary to meter the flow of the gas from the source to the user. It is also often necessary to connect other elements, such as pressure-correctors, to the line for proper control and measurement of the gas flow.

Particularly in the transmission of natural gas, the index of the flow of gas is maintained in ambient air conditions but the flow information comes from a flow sensor which, at one end, is active and maintained in the environment of the fluid which is passing through the transmission lines. At the other end the sensor is coupled into the indexing or metering elements or, in some cases, into the pressure and flow rate correction mechanism. The flow sensor normally used involves a vane which is activated by the flow of gas through a metering chamber. The vane rotates at a rate related to the rate of flow of the fluid being measured. At the opposite end of the sensing device, and in an ambient air environment, there is a coupling unit, sometimes called a "wiggler" which is mechanically coupled into the pressure correcting or indexing mechanism. There is a rotary seal about the shaft which couples the two ends of the sensing element. This sensing element, in the natural gas transmission field, is referred to as an "axle box". With time, because of the rotary motion of the shaft in the axle box, the seal wears and leaking of gas through the seal occurs. This, of course, is not tolerable for two reasons. First, it is highly dangerous to permit the leakage of natural gas into any region, particularly into a basement where such metering devices are normally found. The explosive power of natural gas is well known. Second, the accuracy of the correction or of the gas flow measurement is reduced as leakage increases. For both these reasons, from time-to-time it is necessary in a gas transmission line to replace the axle boxes which are associated with the gas meters or volume-pressure correctors.

In the past, in order to replace the axle box assembly it has been necessary to completely by-pass the meter, a process which can take from one to three hours. It also requires several people to achieve the by-passing result. There also is a degree of danger involved in the complete by-pass procedure. In addition to the safety factor, the cost of the labor utilized in by-passing the meter and replacing the axle box by that process is unnecessarily and undesirably excessive.

It is further object of this invention to provide a tool assembly which will permit easy replacement of the flow sensing element in a transmission line for fluids under pressure.

SUMMARY OF THE INVENTION

A tool assembly is provided which comprises three major elements:

First, a base sealing element which can be secured to the metering chamber over the sensing element or axle box after the indexing or volume correcting portion of the meter has been removed from the metering chamber;

Second, a shaft element carrying at one end a socket which is sized and shaped to correspond to the upper flange portion of the sensing element or axle box so as to firmly engage that upper flange portion of the axle box for rotation of the axle box in its insertion and removal; and, Third, a stuffing box which can fit over the shaft and can be joined to the base sealing unit in hermetically sealed fashion.

The base sealing unit includes a gate valve which is effective to cut off the escape to the atmosphere of any gas or other fluid under pressure from the transmission line when the axle box has been removed from its place inserted in the wall of the metering chamber. For example, this occurs when the shaft carrying the socket at its lower end has extracted the axle box from the metering chamber and the shaft has been withdrawn so that the socket portion carrying the axle box is in the stuffing box portion of the tool assembly according to this invention. With the tool shaft and socket removed to that position, the stuffing box section is decoupled from the base sealing unit and the axle box is removed from the socket which is at one end of the shaft. A new axle box is secured in the socket portion at the lower end of that shaft, the stuffing box portion of the tool assembly is recoupled to the base sealing section, the gate valve in the base sealing section is then opened to permit passage of the shaft and the socket carrying the new axle box is inserted in the opening, normally threaded, in the metering chamber wall and firmly moved into place by rotary motion of the shaft carrying the socket. It is to be understood that the opening in the wall of the metering chamber is normally threaded as is the outer surface of the axle box and the top of the axle box is flanged to overlap the threaded opening in the upper wall of the metering chamber. A sealing washer is also provided between the flange at the upper end of the axle box and the upper surface of the metering chamber engaged by such flange.

When the shaft having the socket at one end is withdrawn, either after the axle box has been removed or has been replaced, the gate valve can be closed and any gasses accumulated in the stuffing box can be vented through a bleed-hole in the stuffing box, which hole, after the bleeding process has been completed, is covered by a collar which slides into position over the hole. No by-passing of the metering chamber is necessary when the tool assembly according to this invention is used.

BRIEF DESCRIPTION OF THE DRAWINGS

This invention can best be understood by reviewing the description which follows in conjunction with the drawings herein in which.

DETAILED DESCRIPTION OF THE PREFERRED EMBODIMENT

Figure 1:
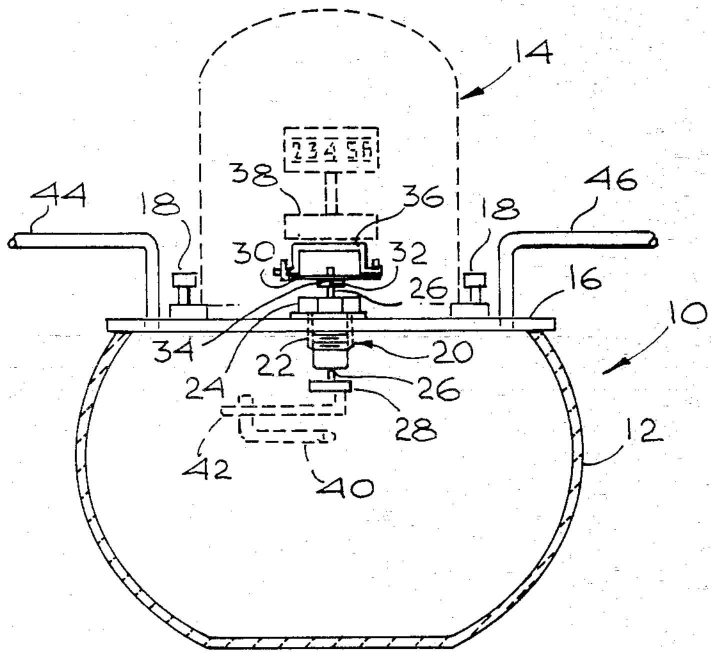
FIG. 1 is a diagrammatic representation of a metering structure in a transmission line for volatile fluids under pressure, to which my invention is applicable; and, FIG. 2 is a diagrammatic representation of the tool assembly according to my invention.

In FIG. 1, meter 10 includes a metering chamber 12 and a volume or pressure corrector, or index, 14 secured to the upper wall 16 by means of threaded bolts 18. Axle box 20 has a body portion 22 which is threaded and, an upper flange 24, which may be hexagonal in shape for ease of securing axle box 20 in upper wall 16 of metering chamber 12. A shaft 26 runs coaxially through body 22. At the lower end of shaft 26 is secured a paddle-like activator portion 28. At the upper end of shaft 26 there is a first wiggler 30 which is secured to shaft 26 by a set screw 32 and collar 34.

Wiggler 30 is designed to engage and cooperate with a driving member 36 which is a portion of either the indexing or volume and pressure correcting mechanism included in volume and pressure corrector or indexing portion 14 of meter 10.

In normal operation of meter 10, paddle 28 is caused to rotate or oscillate by elements 40 and 42 contained within the metering chamber 12. Inlet pipe 44 introduces the fluid or gas under pressure into metering chamber 12. Outlet pipe 46 passes the fluid under pressure to the user or the next measuring point. The actual mechanism for causing paddle 28 and the shaft 26 to which it is connected to oscillate or rotate is not part of this invention and need not be described here. Shaft 26 is carried in a plastic bushing with low-friction characteristics. Such a material may be Teflon. By reason of the rotation or oscillation of shaft 26 in the bushing material within axle box 20, the bushing material is worn and gradually leakage begins to occur around shaft 26. Thus, some of the fluid or gas under pressure in metering chamber 20 escapes around shaft 26 and reduces the accuracy of the metering step and further raises certain dangers because of the normal volatility of the gas or other fluid being transmitted through pipes 44, 46. Thus, it is necessary, from time-to-time, to replace axle box 20. In the past, to achieve that end it was necessary to by-pass meter 10 with a rather elaborate network of pipes and fixtures. The process was time consuming and potentially dangerous.

Figure 2:
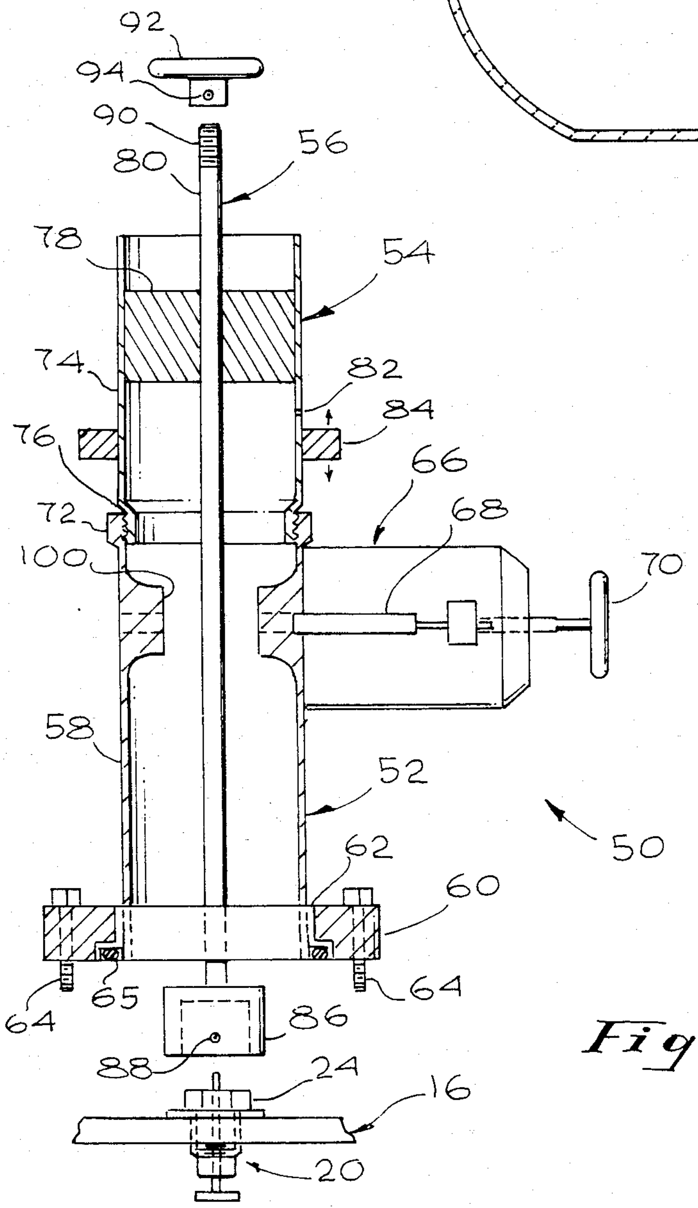

Turning to FIG. 2, there is shown a tool assembly which avoids the by-passing operation previously required when an axle box began leaking. In that figure, tool assembly 50 includes a base sealing unit 52, a stuffing box unit 54 and an axle box removal unit 56.

Base sealing unit 52 includes a tube portion 58, and a sealing flange portion 60 rotatably coupled to the lower end 62 of tube 58. The ability of flange 60 to rotate is necessary in order to assure that the attachment screws 64 will align with the corresponding receiving openings in the upper wall 16 of metering chamber 12 in FIG. 1.

Towards the upper end of base sealing unit 52 there is a gate-valve assembly 66 comprising a gate-valve element 68 adjustable in its position internally to cylinder 58 by means of knob 70 which, upon rotation, causes valve element 68 to move into the space within tube 58 to block off the flow of fluids through tube 58. The construction of the gate-valve mechanism is well known and need not be explained here. The upper end 72 of tube 58 is internally threaded to receive stuffing box 54.

Stuffing box 54 includes tube 74 having threads 76 at the lower end thereof, cooperating with the internal threads in upper portion 72 of base sealing unit 52. Unit 54 also includes stuffing material 78 which is impervious to the gas or other fluid in the transmission system being maintained. However, it does have a central opening therethrough for the passage of the shaft portion 80 of axle box removal unit 56. Stuffing or packing material 78 fits snugly about shaft 80 as it passes through packing material 78. Stuffing box unit 54 includes, in addition, a bleeding-hole 82 for bleeding off gas or other fluid when gate-valve 66 is closed. When gate-valve 66 is open, collar 84 is slid over bleeding-hole 82 to prevent the escape to the atmosphere of the gas or other fluid being transmitted in the associated transmission system.

Axle box removal unit 56 includes shaft 80 at one end of which is socket 86 having internal dimensions designed to cooperate with flange 24 of axle box 20. Socket 86 also includes a set screw 88 which may be of the Allen-head variety. It is to be understood that socket 86 is in a fixed position on one end of shaft 80. At the other end of shaft 80 there may be a threaded portion 90 for receiving a handle 92 having a set screw 94 therein. This handle is useful in manually rotating axle box removal unit 56. The handle is screwed on to threaded portion 90 when insertion or removal of an axle box is to occur and after the rest of the tool assembly is in position for operation.

The steps involved in utilizing tool assembly 50 are as follows. First, remove index box or pressure corrector assembly 14 by loosening studs 18. Wiggler 30 of axle box 20 easily decouples from driving element 36 of the index box assembly 14. Next, remove wiggler 30 from shaft 26 by loosening set screw 32. Now slightly loosen the axle box assembly so as to break the seal at the juncture of flange 24 with upper wall 16 of metering chamber 12. The purpose of this step is to make easier the use of the axle box removal unit 56.

Next with axle box removal unit 56 removed from the rest of the tool assembly 50 (after removing handle 92 from upper and threaded end 90 and sliding shaft 26 out through stuffing material 78 in the stuffing box unit 54), socket 86 is applied to flange 24 of axle box unit 20 and set screw 88 is tightened to assure a good grip on flange 24.

Base sealing unit 52 is then dropped over removal unit 56 and flange 60 is rotated until studs 64 line up with receiving threaded holes in the upper wall 16 of metering chamber 12. Studs 64 then are tightened, which brings sealing ring 65 into firm contact with the upper surface of wall 16 and blocks any flow of gas or other fluid out through the rotating joint between flange 60 and the lower portion of tube 58 in base sealing unit 52.

Stuffing box unit 54 is then slipped into position over shaft 80 and coupled to base sealing unit 52 rotating tube 74 so that its threads 76 cooperate with the inner threads in the upper portion 72 of base sealing unit 52. Handle 92 may then be applied to the upper end of shaft 80 and secured in position by set screw 94. Care must then be taken to assure that collar 84 is slid into position over bleed-hole 82. At this point the tool assembly is hermetically sealed and in position over and in cooperative relation with axle box 20. Handle 92 is then rotated in the appropriate direction, usually counter-clockwise, to remove axle box 20 from upper wall 16 of metering chamber 12. Shaft 80 is then pulled upward until socket 86 is above the operative portion of gate-valve 66, at which point handle 70 is turned until gate-valve 66 is closed by reason of valve element 68 spanning the space between opposing portions of the inner wall 100 of tube 58. Stuffing box unit 54 may now be decoupled from base sealing unit 52 by rotating tube 34 in an appropriate direction to cause threaded portions 72 and 76 to disengage, at which point stuffing box unit 54 carrying axle box removal unit 56 may be taken aside and set screw 88 may be rotated to release axle box 20 from socket 86. A new axle box is then secured in socket 86 by means of screw 88 and the procedure is reversed.

Prior to the decoupling of stuffing box unit 54 from base sealing unit 52, with shaft 80 retracted so that socket 86 is in the region above gate-valve 66, with that valve closed, it is desirable to bleed down any gas which is accumulated in the stuffing box unit. This is accomplished by sliding collar 88 out of contact with bleed-hole 82 so that any gas or other fluid may escape. The quantity of that gas of course is very limited.

Returning to the new axle box insertion procedure, with the new axle box firmly gripped by socket 86 and with a sealing washer 96 crimped so that it will stay on the threaded body of axle box 20, stuffing box unit 54 is recoupled to base sealing unit 52, with shaft 80 still retracted. Gate-valve 70 is then opened and shaft 80, carrying in socket 86 the new axle box, is pushed downwardly until the new axle box engages the threaded opening provided for it in the upper wall 16 of metering chamber 12. Handle 92 may be applied to the upper end of shaft 80, at this point, and the shaft may be rotated slowly until axle box 20 is firmly seated in the appropriate opening in the upper wall 16 of metering chamber 12. At that point, further leakage of gas out of metering chamber 12 is cut off so the tool assembly may be bled down by sliding collar 84 off of its previous position over bleed-hole 82, in which position it was placed prior to the opening of gate-valve 66 for the insertion of axle box 20.

Stud 64 may then be released and the entire assembly 50 removed from the upper wall of the metering chamber 12. Wiggler 30 is then reapplied to shaft 26 and set in position by set screw 26.

At this point the original apparatus whether it be a standard index box assembly, a pressure corrector or any other element involved in the registration of pressure or flow and designated by numeral 14, is returned to its original position on the upper wall 16 of metering chamber 12 and the unit is now completely ready for operation in a normal fashion.

It has been found that by using the tool assembly taught by this invention the amount of time necessary to make the change of an axle box in a live transmission line is about 15 minutes instead of the previously required time of approximately three hours. Further, a single operator may perform the change and with greater safety and less tools.

While this discussion has been primarily directed to the replacement of an axle box in a gas transmission line, the tool involved and described here is equally applicable to other transmission systems where a fluid, which is volatile, is being transmitted under pressure and there is some sensing element which invades the space where the fluid is flowing, on its one side, and is exposed to ambient air, on its other side.

While a particular embodiment of this invention has been shown and described, it will be apparent to those skilled in the art that variations and modifications may be made therein without departing from the spirit and scope of this invention. It is the purpose of the appended claims to cover all such variations and modifications.

I claim:

1. A tool for replacing an axle box in a member such as a meter, or the like, in a gas distribution system carrying gas under pressure, said member, having, a flat surface carrying said axle box, said flat surface having threaded openings proximate to the periphery thereof;

a base sealing portion including a first pipe having first and second ends, said first end carrying threads and said second end carrying a flange;

said flange on said second end of said first pipe having openings therein for passing threaded bolts therethrough, said flat surface of said member having corresponding threaded openings for receiving said bolts and securing said flange directly to said member;

a gate valve included in said base sealing portion intermediate its first and second ends for controlling the flow of gas through said first pipe;

a stuffing box portion having a second pipe with first and second ends, said first end of said second pipe carrying threads sized and pitched to cooperate with said threads carried by said first end of said first pipe;

said stuffing box portion including a bleed-hole in the wall of said second pipe;

stuffing means carried in said second pipe between said bleed-hole and said second end of said second pipe, said stuffing means having an axial opening therethrough;

closing means for selectively closing said bleed-hole; and, an element-removal portion including a shaft, a handle removably attached to said shaft at one end and a socket coaxially affixed to said shaft at its other end, said shaft being sized to hermetically seal said axial opening in said stuffing means, said socket being sized to firmly engage said element to be removed.

2. Apparatus according to claim 1 in which said flange is free to rotate on said second end of said first pipe.

3. Apparatus according to claim 1 in which said closing means is a collar slideable on said second pipe.

4. Apparatus according to claim 1 in which said socket includes a set screw.

5. Apparatus according to claim 1 in which said second end of said first pipe is flanged and carries an O-ring for forming a hermetic seal with said member.

* * * * *